Aug. 9, 1927.
C. R. PATON
1,638,782
AUTOMOBILE CONSTRUCTION
Filed Jan. 3, 1927
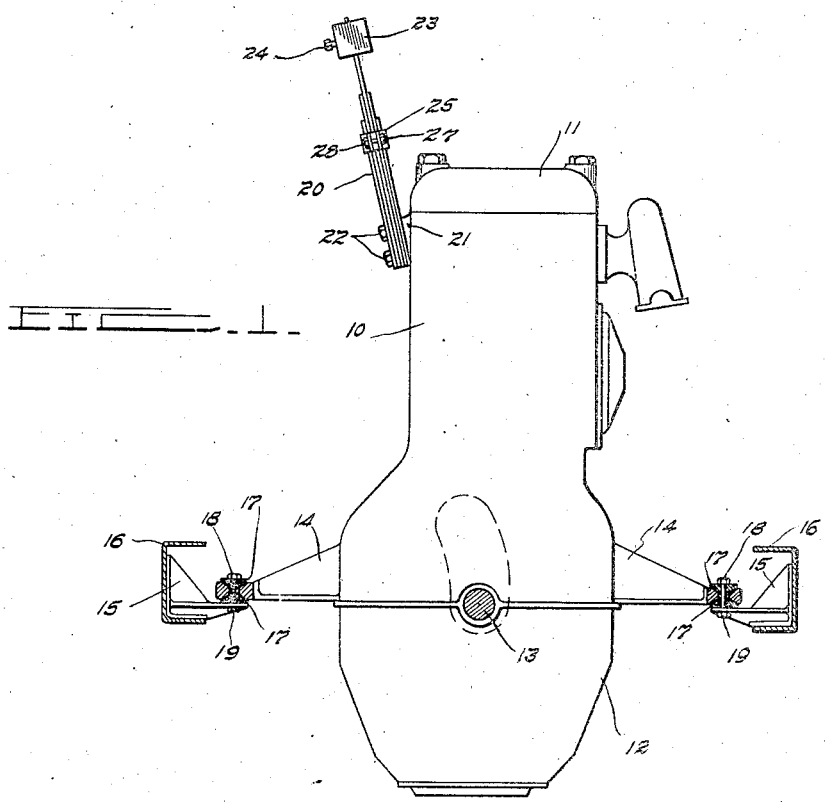
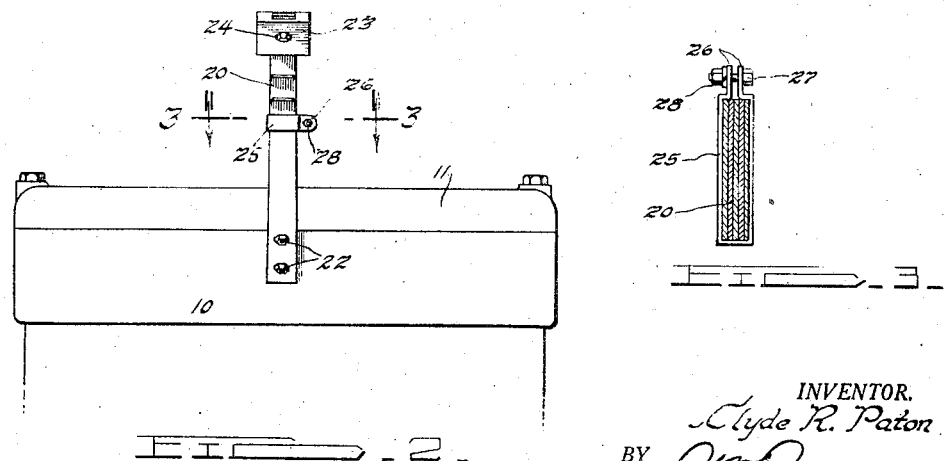
INVENTOR.
Clyde R. Paton
BY
P. W. Pomeroy
ATTORNEY Patented Aug. 9, 1927.

1,638,782

UNITED STATES PATENT OFFICE.

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY.

AUTOMOBILE CONSTRUCTION.

Application filed January 3, 1927. Serial No. 158,675.

This invention relates to automobile constructions and particularly to means for preventing torque reactions of the motor of a vehicle from being apparent to the occupants of the vehicle of which it forms a part.

The principal object of the present invention is to provide means for damping excessive rocking or vibration of the engine of a motor vehicle caused by synchronization of the explosions of the engine with the natural period of vibration of its supporting means, or with a harmonic thereof.

Another object is to provide a vibratory system mounted on an internal combustion engine, having a natural period of vibration such as to be caused to vibrate in sympathy with the vibration of the engine at such time as the explosions in the engine synchronize with the natural period of vibration of the engine supporting means, or with a harmonic thereof.

Another object is to provide, in combination with an internal combustion engine and its supporting means, a vibratory system for absorbing energy from said engine and dissipating the same at such time as the explosions in said engine synchronize with the natural period of vibration of its supporting means, or with a harmonic thereof.

Another object is to provide, in combination with an internal combustion engine and its supporting means, a vibratory system having a natural period of vibration which will take up energy from said engine and will dissipate the same, at such time as the explosions in said engine synchronize with the natural period of vibration of its support, or with a harmonic thereof, whereby excessive movement of said engine relative to its support will be dampened.

Another object is to provide, in combination with an internal combustion engine subject to excessive rocking movement upon synchronization of the explosions in said engine with the natural period of vibration of its support, a spring-controlled mass having a suitable natural period of vibration positioned to be affected by said excessive movement, whereby the mass will absorb energy from said engine and will be caused to vibrate, means being provided for dissipating the energy so absorbed by said mass.

Another object is to provide, in combination with an internal combustion engine subject to excessive rocking movement upon synchronization of the explosions of said engine with the natural period of vibration of its supporting means, a spring-controlled mass movable with respect to said engine and having a natural period of vibration bearing a suitable relation for the period of vibration of said engine at such time as the explosions therein synchronize with the natural period of its supports, whereby the energy in said engine due to such excessive movement will be absorbed by said mass and will be converted into a vibratory movement of said mass of greater amplitude than the vibrations of the engine, means being provided for frictionally resisting vibration of said mass whereby the energy absorbed thereby from said engine will be dissipated.

Another object is to provide, in combination with an internal combustion engine, a leaf spring secured at one end to the engine and provided with a mass at its free end, positioned to be capable of vibrating transversely of the axis of said engine, the leaf spring being so proportioned that the mass has a natural period of vibration such as to be caused to vibrate in sympathy with the vibration of the engine at such time as the explosions of said engine synchronize with the natural period of vibration of the engine supporting means, means being provided for frictionally resisting the vibration of the mass.

A further object is to provide, in combination with an internal combustion engine, a multiple leaf spring secured at one end to the engine and provided at its opposite end with a mass, and so positioned that the direction of vibration of the mass is transverse to the longitudinal axis of the engine, the multiple leaf spring being so proportioned that the mass has a natural period of vibration such as to be caused to vibrate in sympathy with the vibration of the engine upon synchronization of the explosions in the engine with the natural period of vibration of the engine supporting means, means being provided for causing friction between the leaves of the multiple leaf spring whereby movement of the mass will be frictionally resisted.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the different views, Figure 1 is an end view of an internal combustion engine shown mounted in the frame of an automobile, a suitable embodiment of the present invention being shown in connection therewith.

Figure 2 is a side view of the upper portion of the engine shown in Figure 1.

Figure 3 is a sectional view taken on the line 3—3 of Figure 2.

It is desirable that the engine of a motor vehicle be flexibly mounted in order that the torque reactions due to the separate explosions in the engine will not be transmitted suddenly and with full force to the chassis, and the torque reactions be apparent to the occupant of the vehicle as noticeable impulses or vibration. However, when such yielding engine support is employed, at certain speeds of the engine the number of explosions per unit of time therein corresponds to the natural period of vibration of its support, in which case the reaction in the motor due to the explosions synchronizes with the natural period of vibration of its support and a very apparent and noticeable vibration of the whole engine becomes apparent.

The present invention deals with means for preventing this apparent vibration of the engine due to such synchronization from being apparent to the occupant of the vehicle of which the engine forms a part. In the present invention, I consider the engine as a primary vibrating system having a natural period of vibration corresponding to the vibration thereof at such time as the explosions in the engine synchronize with the natural period of vibration of its support. I then provide a secondary system carried by, or so connected to, the engine as to be affected thereby, and having a natural frequency of vibration substantially the same, or slightly less, than the frequency of vibration of the primary system, or a harmonic thereof. The result is that upon vibration of the engine at such time as the explosions therein synchronize with the natural period of vibration of its support, the secondary system is caused to vibrate in sympathy therewith, and absorb energy from the primary system. It will be apparent from the foregoing that the natural period of vibration of the secondary system is approximately equal to the natural period of vibration of the engine support, or a harmonic thereof.

Means are provided for frictionally resisting the sympathetic vibration of the secondary system whereby such energy is dissipated, with the result that the energy tending to cause vibration of the engine at the time described is dissipated and substantially no vibration occurs. While such secondary vibrating system may assume many different forms and may be placed in a variety of positions to be affected by the vibration of the primary system, and various means may be provided for frictionally resisting the movement of the secondary system for dissipating the energy therein which has been absorbed in the primary system. I show in the accompanying drawings, by way of illustration, one embodiment which successfully accomplishes the results desired. Accordingly I show in Figure 1 an internal combustion engine having a cylinder block 10, cylinder head 11, oil pan 12 and crank shaft 13. Supporting arms 14 project laterally from the cylinder block 10 and are received on brackets 15 secured to the frame side member 16 of the vehicle in which the engine is supported. The arms 14 are each insulated from the brackets 15 by means of a pair of opposed conical shaped rubber blocks 17 received in similarly shaped depressions in the end of the arm 14. Bolts 18 extending down through the end of the arm 14 and rubber blocks 17 pass through the bracket 15 and are secured in place by nuts 19, thus preventing relative displacement of the engine in respect to the frame 16. These rubber blocks 17 provide a yielding support for the engine whereby under normal conditions the torque reactions of the motor are absorbed thereby and are prevented from reaching the frame 16 to such an extent as to be apparent to the occupant of the vehicle of which the engine forms a part. The frame 16 is, of course, yieldable to a slight extent in itself, and also acts to absorb the torque reactions of the motor. However, at certain speeds of the engine the number of explosions per unit of time therein corresponds to the natural period of vibration of the engine support with the result that an excessive vibratory movement is imparted to the engine about the crank shaft 13 as a center, and this excessive vibratory movement is transmitted to the whole vehicle as a very apparent vibration.

To eliminate the apparent vibration caused by the synchronization of the explosions of the engine with the natural period of vibration of the engine supports, I provide, in accordance with the present invention, a multiple leaf spring 20 secured at one end to a pad 21 formed adjacent the upper edge of the cylinder block 10 and secured thereto by screws 22, the plane of the leaves of the spring being disposed longitudinally of the engine, and the spring 20 being positioned longitudinally preferably in a line radial to the crank shaft 13. The leaves of the spring 20 are successively lengthened from the outer leaf to the inner leaf which projects substantially further upward than the remainder. A mass or weight 23 is adjustably secured to the upper end of the center leaf of the spring 20 by means of a set screw 24. The spring 20 is so proportioned in respect to the mass 23 that the mass 23 has a natural period of vibration substantially equal to or slightly less than the period of vibration of the engine at the time that the explosions therein synchronize with the natural period of vibration of the engine support, or, as previously explained, approximately equal to the natural period of vibration of the support itself, or a harmonic thereof. When the engine begins to vibrate excessively due to the synchronization of the explosions therein with the natural period of vibration of its support, the mass 23 is caused to vibrate in sympathy therewith, and if the spring 20 is of sufficient length, the mass will vibrate with a greater amplitude of vibration than the amplitude of vibration of the engine. The energy necessary to cause the mass 23 to vibrate is, of course, absorbed from the engine, and in dissipating the energy absorbed by the mass 23, the energy tending to cause excessive vibration of the engine at the particular speed in question is thereby dissipated and the cause of vibration is removed, with the result that no apparent vibration occurs.

The means relied on in the construction shown for dissipating the energy absorbed by the mass 23 is the friction between the various leaves of the spring 20, which friction becomes apparent upon bending the spring 20 and tends to resist such bending. In order to control the amount of friction between the various leaves of the spring 20, and therefore to control the amount of energy capable of being absorbed and dissipated by the mass 23, I provide a clip 25 encircling all the leaves of the spring 20, provided with upstanding spaced ears 26 at one side of the spring 20, a bolt 27 projecting through the ears 26 and receiving on the projecting end thereof a nut 28. The nut 28 may be adjusted on the bolt 27 to cause the clip 25 to more loosely or closely embrace the spring 20 whereby to set up a lesser or a greater amount of friction between the leaves thereof. The nut 28 is therefore capable of being adjusted on the bolt 27 in order to obtain the most satisfactory performance of the device in question.

It will be apparent that the resiliency of the spring 20 and the amount of weight of the mass 23 will necessarily vary in accordance with the particular engine and particular engine support in connection with which the device is used. The correct proportion may be determined in many different ways readily apparent to those skilled in the art. It will also be apparent that the particular form of vibratory system may be varied from that shown in the drawing; for instance, such as a weight slidably mounted on a support and suitably restrained against slidable movement by coil or other springs.

Formal changes may be made in the specific embodiment of the invention described without departing from the spirit or substance of the broad invention, the scope of which is commensurate with the appended claims.

What I claim is:

1. In an internal combustion engine and a support therefor, a vibratory system therefor positioned to be affected by the vibration of said engine at an engine speed wherein the number of explosions per unit of time in said engine synchronizes with the natural period of vibration of said support, and to be set in motion thereby, and means for frictionally resisting said motion.

2. In an internal combustion engine having a support, a vibratory system therefor positioned to be affected by the vibration of said engine at an engine speed at which the number of explosions per unit of time in said engine synchronizes with the natural period of vibration of said support, said vibratory system having a natural period of vibration such that it will take up energy from said engine, and means for dissipating said energy.

3. In combination with an internal combustion engine and a support therefor, a spring-controlled mass movable relative to said engine and positioned to be affected by movement thereof caused by torque reaction, said mass having a natural period of vibration such as to be caused to vibrate in sympathy with the vibration of said engine at a speed at which the number of explosions per unit of time in said engine synchronizes with the natural period of vibration of said support, whereby said mass will absorb energy from said engine, and means for dissipating said energy absorbed by said mass.

4. In combination with an internal combustion engine and a support therefor, a spring-controlled mass secured to said engine having a natural period of vibration such as to be set in vibration when the frequency of explosions in said engine corresponds to the frequency of the natural period of vibration of said support or a harmonic thereof, and means for frictionally damping vibratory movement of said mass.

5. In combination with an internal combustion engine and a support therefor, a spring-controlled mass carried by said engine and positioned to vibrate in a plane transverse thereof, said spring-controlled mass having a natural period of vibration approximating the natural period of vibration of said support, or a harmonic thereof, and means for frictionally damping vibratory movement of said mass.

6. In combination with an internal combustion engine and a support therefor, a spring-controlled mass secured to said engine and positioned to be affected by vibration of said engine as a whole about its crank shaft as a center, said mass having a natural period of vibration corresponding to the natural period of vibration of said support or a harmonic thereof, whereby when said engine vibrates about said crank shaft as a center at a frequency corresponding to the frequency of the natural period of vibration of said support said mass will be caused to vibrate in sympathy therewith, and means for frictionally damping vibratory movement of said mass.

7. In combination with an internal combustion engine and a support therefor, a leaf spring secured to said engine at one end and positioned to be capable of maximum flexure in a plane transverse to said engine, a mass secured adjacent to the free end of said spring, said spring being so proportioned in respect to said mass as to impart to said mass a natural period of vibration approximating the natural period of vibration of said support or a harmonic thereof, and means for frictionally resisting vibratory movement of said mass.

8. In combination with an internal combustion engine and a support therefor, a leaf spring secured at one end of said engine and provided adjacent its free end with an adjustable weight, the plane of the leaf of said spring being parallel with the crank shaft of said engine and the length of said spring being substantially radial to said crank shaft.

9. In combination with an internal combustion engine and a support therefor, a multiple leaf spring secured at one end to said engine and positioned in a generally radial direction in relation to the crank shaft thereof, and a mass secured adjacent to the free end of said spring, said spring and mass being so proportioned that said mass has a natural period of vibration approximately equal to the natural period of vibration of said support or a harmonic thereof.

10. In combination with an internal combustion engine and a support therefor, a multiple leaf spring secured at one end to said engine and positioned in a generally radial position relative to the crank shaft thereof, a mass secured adjacent to the free end of said spring, said spring and said mass being so proportioned as to have a natural period of vibration approximating the natural period of vibration of said support or a harmonic thereof, and means for adjustably controlling the friction between the leaves of said spring.

Signed by me at South Bend, Indiana, this 30th day of December, 1926.

CLYDE R. PATON.